United States Patent [19]

Shabrang et al.

[11] Patent Number: 5,124,080
[45] Date of Patent: Jun. 23, 1992

[54] ELECTROCHROMIC DEVICE

[75] Inventors: Mani Shabrang; Susan J. Babinec, both of Midland, Mich.

[73] Assignee: The Dow Chemical Company, Midland, Mich.

[21] Appl. No.: 790,095

[22] Filed: Nov. 1, 1991

Related U.S. Application Data

[63] Continuation of Ser. No. 488,908, Mar. 6, 1990, abandoned.

[51] Int. Cl.$^5$ .......................... G02F 1/00; G02F 1/01; G02B 5/23
[52] U.S. Cl. .................................. 252/583; 252/586; 359/265; 359/270
[58] Field of Search ................ 252/583, 586; 359/265, 359/270, 275

[56] References Cited

U.S. PATENT DOCUMENTS

| | | | |
|---|---|---|---|
| 3,971,624 | 7/1976 | Bruesch et al. | 350/160 |
| 4,116,545 | 9/1978 | Reddy | 350/357 |
| 4,193,670 | 3/1980 | Giglia et al. | 350/357 |
| 4,231,641 | 11/1980 | Randin | 350/357 |
| 4,330,654 | 5/1982 | Ezzell et al. | 526/243 |
| 4,337,137 | 6/1982 | Ezzell | 204/252 |
| 4,337,211 | 6/1982 | Ezzell et al. | 260/456 |
| 4,338,000 | 7/1982 | Kamimori et al. | 350/357 |
| 4,358,412 | 11/1982 | Ezzell et al. | 260/968 |
| 4,358,545 | 11/1982 | Ezzell et al. | 521/27 |
| 4,361,385 | 11/1982 | Huang et al. | 350/357 |
| 4,433,082 | 2/1984 | Grot | 524/755 |
| 4,462,877 | 7/1984 | Ezzell | 204/98 |
| 4,470,889 | 9/1984 | Ezzell et al. | 204/98 |
| 4,478,695 | 10/1984 | Ezzell et al. | 204/98 |
| 4,515,989 | 5/1985 | Ezzell et al. | 568/674 |
| 4,554,112 | 11/1985 | Ezzell et al. | 260/543 |
| 4,578,512 | 3/1986 | Ezzell et al. | 562/586 |
| 4,687,821 | 8/1987 | Ezzell et al. | 526/247 |
| 4,731,263 | 3/1988 | Martin et al. | 427/385 |
| 4,768,865 | 9/1988 | Greenberg et al. | 350/357 |
| 4,804,727 | 2/1989 | Ezzell et al. | 526/247 |

OTHER PUBLICATIONS

C. R. Martin et al., Dissolution of Perfluorinated Ion Containing Polymers, *Anal. Chem.*, 54, 1639-41 (Aug. 1982).

G. G. Scherer et al., ESCA Investigation of Nafion Membranes, 52-59.

Jean-Paul Randin, Ion-Containing Polymers as Semi-solid Electrolytes in WO$_3$-Based Electrochromic Devices, *J. Electrochem. Soc.*, 129(6), 1215-20 (1982).

Primary Examiner—Robert L. Stoll
Assistant Examiner—Philip Tucker
Attorney, Agent, or Firm—Timothy S. Stevens

[57] ABSTRACT

An improvement of electrochromic devices incorporating a perfluorosulfonic acid polymer ion conducting layer interposed between a working electrode and a counter electrode. The improvement relates to the composition of the perfluorosulfonic acid polymer of the ion conducting layer. In the present invention the composition of the perfluorosulfonate polymer layer is a polymer comprising a substantially fluorinated backbone which has recurring pendant groups attached thereto represented by the formula —O—(CFR$'_f$)$_b$—(CFR$_f$)$_a$—SO$_3$—, where a=0-3, b=0-3, a+b=at least 1, and R$_f$ and R$'_f$ are independently selected from the group consisting of a halogen and a substantially fluorinated alkyl group having one or more carbon atoms. One example of such a polymer is the copolymer of tetrafluoroethylene and 1,1,2,2-tetrafluoro-2-((trifluoroethenyl)oxy)ethane sulfonic acid having an equivalent weight of about 800. The primary benefit of the present invention is that the electrochromic device darkens sufficiently to be useful when the device is operated at high temperature such as can be encountered in an automobile electrochromic sun roof on a sunny day in a hot climate.

22 Claims, 2 Drawing Sheets

ELECTROCHROMIC DEVICE

This is a continuation of application Ser. No. 07/488,908, filed Mar. 6, 1990 now abandoned.

BACKGROUND OF THE INVENTION

Modern electrochromic devices generally comprise a number of layers such as is shown in FIG. 1 of U.S. Pat. No. 4,193,670. One example of such a device is: a backing of a pane of glass first coated with an electronic conductor such as a thin transparent layer of indium/tin oxide to form what some call a front electrode or a working electrode; then the working electrode is coated with a thin transparent layer of tungsten oxide to form an electrochromic layer; then the electrochromic layer is coated with a thin transparent layer of an ion conducting polymer (see U.S. Pat. No. 4,231,641) such as NAFION perfluorosulfonate polymer (from E.I. Du Pont de Nemours and Company, Wilmington Del.) to form an ion conducting layer; and finally the ion conducting layer is coated with a thin transparent coating of gold to form a counter electrode. The completed device usually has the appearance of lightly tinted transparent glass. The device can be made to transmit substantially less light by applying an electrical potential between the working electrode and the counter electrode. This effect can be reversed by reversing the electrical potential. The theory of operation of such a device is: (1) that hydrogen ions and electrons are forced from the ion conducting layer into the electrochromic layer by the electrical potential and form a highly colored hydrogen/tungsten oxide bronze in the electrochromic layer; and (2) when the electrical potential is reversed, the hydrogen ions of the hydrogen/tungsten oxide bronze in the electrochromic layer and electrons are forced out of the electrochromic layer into the ion conducting layer converting the highly colored hydrogen/tungsten oxide bronze back into the essentially colorless tungsten oxide.

A problem with such devices is that when they are operated at high temperature, then the device does not darken sufficiently, if at all, to be useful when the electrical potential is applied between the working electrode and the counter electrode.

SUMMARY OF THE INVENTION

One of the benefits of the present electrochromic device is that when it is operated at high temperatures, e.g., even as high as 90 degrees centigrade or higher, it darkens sufficiently to be useful when an electrical potential is applied between the working electrode and the counter electrode. The present invention is an improvement of electrochromic devices generally comprising an electronic conductor, an electrochromic material, an ion conducting layer comprising perfluorosulfonate polymer and a counter electrode. The improvement of the present invention relates to the composition of the perfluorosulfonate polymer layer. In the present invention the composition of the perfluorosulfonate polymer layer is a polymer comprising a substantially fluorinated backbone which has recurring pendant groups attached thereto represented by the formula $-O-(CFR'_f)_b-(CFR_f)_a-SO_3-$, where $a=0-3$, $b=0-3$, $a+b=$at least 1, and $R_f$ and $R'_f$ are independently selected from the group consisting of a halogen and a substantially fluorinated alkyl group having one or more carbon atoms. One example of such a polymer is the copolymer of tetrafluoroethylene and 1,1,2,2-tetrafluro-2-((trifluoroethenyl)oxy) ethane sulfonic acid having an equivalent weight of about 800.

DETAILED DESCRIPTION OF THE INVENTION

Figure 1:
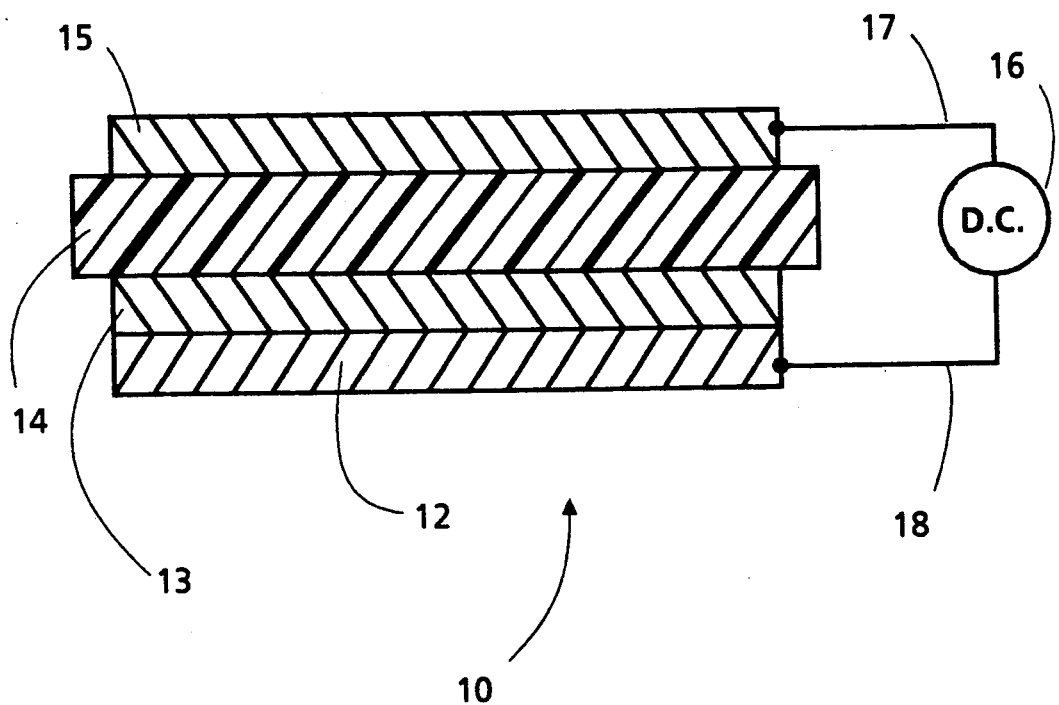
FIG. 1 is a cross-sectional view of the various layers of an embodiment of the present invention, the layers being deposited on a film of perfluorosulfonate polymer.
Figure 2:
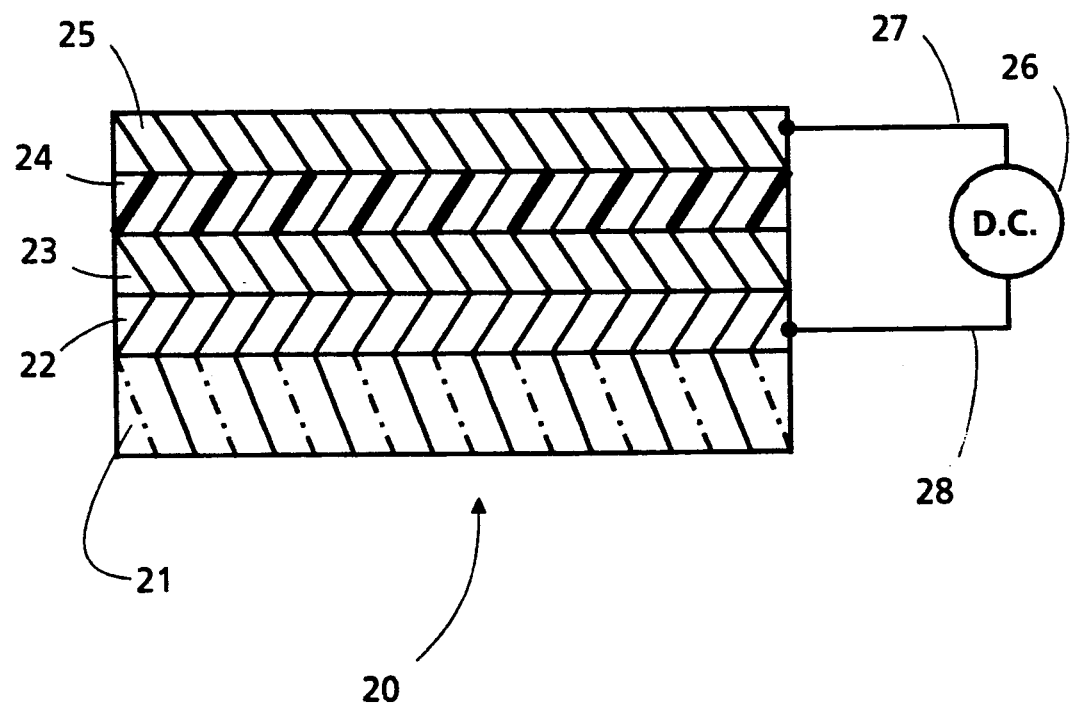
FIG. 2 is a cross-sectional view of the various layers of another embodiment of the present invention incorporating a pane of glass.

Referring now to FIG. 2, therein is shown an electrochromic device 20 according to the present invention which includes a pane of glass 21. An electronically conducting layer 22 of indium/tin oxide is coated on the upper side of the glass 21 to form a front or working electrode. Glass coated with indium/tin oxide is commercially available, e.g., from the Donnelly Corp., Holland Mich., as ITO glass PD5002. An electrochromic layer 23 of tungsten oxide ($WO_3$) is deposited on the electronically conducting layer 12, see for example U.S. Pat. Nos. 4,193,670, 3,971,624, 4,231,641 and 4,338,000. An ion conducting layer 24 of a copolymer of tetrafluoroethylene and 1,1,2,2-tetrafluoro-2-((trifluoroethenyl)oxy)ethane sulfonic acid having an equivalent weight of 780 is formed on the electrochromic layer 23 by a dipping process to be described below. It should be understood that this dipping process is not critical in the present invention and that the ion conducting layer can be formed as desired. A counter electrode layer 25 of gold is deposited on the ion conducting layer 24, see for example U.S. Pat. Nos. 4,338,000 and 3,971,624 for a procedure for depositing gold layers. A direct current power supply 26 is connected to the electronically conducting layer 22 and the counter electrode layer 25 via a wire 27 and a wire 28. A pane of glass or other suitable material such as a sheet of plastic, not shown, can be laminated to the gold layer 25 to protect it if desired. A mirror can be laminated or positioned on either side of the device 20 to make an electrochromic mirror. Referring now to FIG. 1, therein is shown another electrochromic device 10 according to the present invention, suitable, for example, for retrofitting an existing window to an electrochromic window. The device 10 includes an ion conducting film or layer 14 of a copolymer of tetrafluoroethylene and 1,1,2,2-tetrafluro-2-((trifluoroethenyl)oxy) ethane sulfonic acid having an equivalent weight of 780. An electrochromic layer 13 of tungsten oxide ($WO_3$) is deposited on the film 14. An electronically conducting layer 12 of gold is deposited on the electrochromic layer 13. A counter electrode layer 15 of gold is deposited on the ion conducting layer 14. A direct current power supply 16 is connected to the electronically conducting layer 12 and the counter electrode layer 15 via a wire 17 and a wire 18.

The specific material used for the electronically conductor is not critical in the present invention and can include gold and other metals or nonmetals although tin doped indium oxide (indium/tin oxide) is preferred when the device is formed on a pane of glass as shown in FIG. 2 whereas gold is preferred for the embodiment shown in FIG. 1. In some applications a pane of plastic or other suitable material will be used instead of a pane of glass 21 and it need not be transparent. The specific material used for the electrochromic material is not critical in the present invention and can include molybdenum oxide, and other materials that are colored by the simultaneous injection of protons (or other cations) and electrons, although tungsten oxide is preferred, as well as other types of electrochromic materials that are anodically transformed, such as nickel oxide. The specific material used for the counter electrode is not critical in the present invention. It is not critical in the present invention that the above contact each other as shown in FIG. 1 and FIG. 2. For example, the use of interposed silicon oxide and nucleating layers (to increase cycle life time) as taught in U.S. Pat. No. 4,193,670 is specifically contemplated in the present invention. The use of a metal grid (to overcome the IR drop of large areas of transparent working electrodes) as taught in U.S. Pat. No. 4,768,865 is specifically contemplated in the present invention. Thus, the present invention is an improvement upon any electrochromic device that incorporates a perfluorosulfonate polymer ion conducting layer between a working electrode and a counter electrode.

The improvement of the present invention relates to the composition of the perfluorosulfonate polymer of the ion conducting layer. Nafion brand perfluorosulfonate polymer from DuPont was recognized as an ideal material. U.S. Pat. No. 4,231,641. However, work by the present inventor with Nafion as the ion conducting layer in an electrochromic device indicated two problems eventually associated with the use of Nafion: (1) objectionable color of the Nafion layer after it was heated above 80 degrees centigrade; and (2) poor high temperature performance. The color problem with Nafion was solved but the temperature problem was not.

U.S. Pat. No. 4,731,263 to Walter G. Grot of DuPont taught a method for the preparation of liquid dispersions of Nafion that could then be used to prepare thin layers of Nafion. However, these layers could be brownish in color. Charles R. Martin et al. of Texas A&M University described a solvent extraction procedure for eliminating this problem. 54 Analytical Chemistry 1639 (1982). Günther G. Scherer and Peter Pfluger of the Brown Boveri Research Center in Switzerland described a nitric acid extraction procedure for eliminating this problem. 13 Proceedings of the Electrochemistry Society 52 (1986). Whether or not the Nafion was so treated, however, the electrochromic devices made with Nafion essentially stopped working at high temperature. This was considered to be a substantial problem because an electrochromic device used, for example, as a sun window in an automobile or building on a sunny day in a hot climate can be heated to a high temperature.

U.S. Pat. Nos. 4,330,654, 4,337,137, 4,358,412, 4,358,545, 4,462,877, 4,470,889, 4,478,695, 4,515,989, 4,554,112, 4,578,512 4,687,821 and 4,804,727 to Bobby R. Ezzell et al. of The Dow Chemical Company (which are hereby fully incorporated by reference) described a new family of perfluorosulfonate polymers having utility, for example, in the chloralkali industry. U.S. Pat. No. 4,731,263 to Charles R. Martin and Robert B. Moore, III of Texas A&M University (which is hereby fully incorporated by reference) taught a method for the preparation of liquid dispersions of perfluorosulfonate polymers that could then be used to prepare thin solvent-resistant layers of them. The perfluorosulfonate polymer of the above cited U.S. Pat. No. 4,358,545 to Ezzell et al. was studied as an alternative to Nafion in an electrochromic device. The use of this perfluorosulfonate polymer in an electrochromic device was also found to have the color problem but not the temperature problem of Nafion. The color problem was solved by a procedure that will be discussed below involving the use of high purity solvents. Although U.S. Pat. No. 4,358,545 generally describes the perfluorosulfonate polymer of the present invention, it should be pointed out that the equivalent weight limitation of the '545 patent is not applicable in the present invention and that equivalent weights below 800 are specifically included in the present invention. In addition, although it is preferred in this invention to use a perfluorosulfonate polymer layer that is not highly colored, this is not critical in the present invention. There are undoubtedly applications of the present invention where such color is not objectionable, and perhaps even desirable. The primary benefit of the present invention is that it can be operated at high temperature, see Example 3 below.

The thickness of the perfluorosulfonate polymer layer in the present invention is not critical. A thickness of five micrometers has proved to be satisfactory. In theory, a thinner layer should work better because it would have a lower IR drop. However, very thin layers also tend to have pinholes which can cause a device to short out. It may be possible to form pinhole free relatively thin layers by multiple coating from dilute dispersions of the perfluorosulfonate polymer of the present invention. A perfluorosulfonate polymer layer 75 micrometers thick (one thousands of an inch) has been shown to work in the present invention in a device made without a glass support to investigate a device for such applications as retrofitting an existing window, see FIG. 1. A perfluorosulfonate polymer layers thicker than 75 micrometers is contemplated in the present invention.

The preferred ion form of the perfluorosulfonate polymer of the present invention is $H^+$ (hydrogen ion). However, the ion form of the polymer is not critical in the present invention. For example, alkali metal ion form perfluorosulfonate polymer has been shown to work, e.g., lithium ion.

The equivalent weight of the perfluorosulfonate polymer of the present invention is not believed to be critical. A preferred equivalent weight is 780. The lowest equivalent that is believed to be possible in the present invention is 258. The highest equivalent weight that is believed to be workable in the present invention is about 5000. An equivalent weight of 300, 400, 500, 600 or 700 is believed to be workable. An equivalent weight of 2000, 3000 or 4000 is believed to be workable. A preferred equivalent weight range is 700 to 1000.

EXAMPLE 1

This example will show the preferred method of preparing a dispersion of a perfluorosulfonate polymer of the present invention. Referring to the above mentioned Ezzell et al. patents (and especially U.S. Pat. No. 4,358,545), the sulfonyl fluoride form of the polymer is synthesized, using as the monomers tetrafluoroethylene (FFC=CFF) and 1,1,2,2-tetrafluro-2-((trifluoroethenyl)oxy)ethane sulfonyl fluoride (FRC=CFF, where R is —O—CFF—CFF—SOOF, see U.S. Pat. No. 3,560,568) to produce a polymer having an equivalent weight of 780. The polymer is then hot pressed into a film 1-20 thousands of an inch thick at a temperature no hotter than 20 degrees fahrenheit above its softening point. This helps to prevent the formation of a brown to gray color in the polymer. This film is cut into strips and the sulfonyl fluoride groups of the polymer are then converted to sulfonate groups by immersing the strips in 25% sodium hydroxide at 70-80 degrees centigrade for 12 hours. The polymer strips are then boiled repeatedly in deionized water to remove the excess sodium hydroxide. Infrared spectroscopy can be used to confirm conversion of the polymer to the sodium sulfonate form. Please note: A 25% lithium hydroxide solution can be used instead of the 25% sodium hydroxide solution to convert the polymer to the lithium sulfonate form.

The polymer is then converted to the sulfonic acid form by twice immersing the strips in 6N hydrochloric acid at 70-90 degrees centigrade, four hours each time. The polymer is then washed repeatedly in 70 degree centigrade deionized water to remove the excess hydrochloric acid and finally air dried.

A near colorless dispersion of the sulfonic acid form of the polymer in ethanol/water is then prepared. The percentage of polymer to be added to the ethanol/water is determined by the equivalent weight and molecular weight of the polymer. Low equivalent weight polymers may be made up to give a higher weight percent solution than required and then diluted with additional quantities of ethanol and water to provide more solution. Typically an 800 equivalent weight polymer is made up at 5-10 percent by weight. High equivalent weight polymers having high melt viscosities are typically made up at 2 percent by weight.

It is very important in preventing the formation of color in the dispersion to use ethanol which does not contain ketones or other color forming impurities. Ethanol denatured with methanol or isopropanol has been found to be acceptable. The dried polymer strips are immersed in a 50/50 weight percent ethanol/water mixture and heated in a pressure reactor at 240 degrees centigrade for one to twelve or more hours to form the dispersion, a longer time being needed for the higher molecular weight/equivalent weight polymers. WARNING, diethyl ether can be produced as a by-product during this reaction. The reactor is cooled and opened in a hood. The dispersion is then filtered by passing it through a coarse glass frit to remove any gels or undissolved material.

EXAMPLE 2

This example will show how to prepare an electrochromic device of the present invention, of the kind shown in FIG. 2, using the dispersion of Example 1. A 1×2 inch indium/tin oxide (ITO) coated glass slide (PD5002, Donnelly Corp., Holland Mich.) is soaked in a 50% sodium hydroxide solution for 10-15 minutes and then washed thoroughly with deionized water to clean it. A small peripheral area of the ITO layer is coated with silver paint to facilitate an electrical connection to the ITO layer. A 3,000-4,000 Angstrom thick layer of tungsten oxide is deposited on the remaining ITO layer in a deposition chamber operated at a base oxygen pressure of $2\times10^{-5}$ torr and a substrate temperature of 50-70 degrees C. The slide is then dipped in the filtered solution of Example 1 for a few seconds, removed and then the inactive side of the slide is wiped clean. The slide is then placed in an oven at 85-90 degrees C for two hours to form the ion conducting layer on the tungsten oxide layer. Then, a 200-300 Angstrom thick layer of gold is deposited on a 1×3 centimeter central area of the ion conducting layer in a deposition chamber operated at base pressure of $1\times10^{-5}$ torr. A 600-1000 Angstrom thick additional gold layer is made on a small peripheral portion the gold layer to provide a thicker more rugged electrical connection to the gold layer. A 2.5 volt direct current (D.C.) power source is connected to the device (+ to the gold layer, − to the ITO layer) to darken it. The device remains darkened for an hour even when the potential is removed. Reversing the potential lightens the device. Please note that a device of the type shown in FIG. 1, although not the subject of this example, can be made by treating the polymer film as above but not cutting it into strips and not forming a dispersion of it. The various layers can then depositing on the converted film.

EXAMPLE 3

The device of Example 2 is placed in a temperature controlled environment. The optical density change of the device is studied as a function of the amount of current placed into and taken away from the device and the temperature of the device. At 20 degrees centigrade, the device has a maximum optical density change of 1. At 30 degrees centigrade the device has a maximum optical density change of 0.85. At 49 degrees centigrade the device has a maximum optical density change of 0.8. At 71 degrees centigrade the device has a maximum optical density change of 0.56. At 95 degrees centigrade the device has a maximum optical density change of 0.45.

What is claimed is:

1. In an improved electrochromic device comprising an electronic conductor, an electrochromic material, an ion conducting layer comprising perfluorosulfonate polymer and a counter electrode, wherein the improvement comprises: that the perfluorosulfonate polymer of the ion conducting layer comprises a polymer consisting essentially of a substantially fluorinated backbone which has recurring pendant groups attached thereto represented by the formula $-O-(CFR'_f)_b-(CFR_f)_a-SO_3-$, where a=0-3, b=0-3, a+b=at least 1, and $R_f$ and $R'_f$ are independently selected from the group consisting of a halogen and a substantially fluorinated alkyl group having one or more carbon atoms.

2. The device of claim 1, wherein the formula is $-O-(CFR'_f)_b-(CFR_f)_a-SO_3-H^+$, where a=0-3, b=0-3, a+b=at least 1, $R_f$ and $R'_f$ are independently selected from the group consisting of a halogen and a substantially fluorinated alkyl group having one or more carbon atoms.

3. The device of claim 2, wherein the electronic conductor comprises a layer of a member of the group consisting of gold and indium/tin oxide, wherein the electrochromic material comprises a layer of tungsten oxide, and wherein the counter electrode comprises a layer of gold.

4. The device of claim 2, wherein the electronic conductor consists essentially of a layer of a member of the group consisting of gold and indium/tin oxide, wherein the electrochromic material consists essentially of a layer of tungsten oxide, and wherein the counterelectrode consists essentially of a layer of gold.

5. The device of claim 4, wherein the ion conducting layer consists essentially of a copolymer of FFC=CFF and FRC=CFF, where R is $-O-CFF-CFF-SOOO-H^+$.

6. The device of claim 5, wherein the equivalent weight of the copolymer is between about 700 and about 1000.

7. The device of claim 1, wherein the electronic conductor is an essentially transparent electrically conducting material layered on a pane of material selected form the group consisting of glass and plastic.

8. The device of claim 2, wherein the electronic conductor is an essentially transparent electrically conducting material layered on a pane of material selected from the group consisting of glass and plastic.

9. The device of claim 3, wherein the electronic conductor is an essentially transparent layer of indium/tin oxide on a pane of material selected from the group consisting of glass and plastic.

10. The device of claim 4, wherein the electronic conductor is an essentially transparent layer of indium/tin oxide on a pane of material selected from the group consisting of glass and plastic.

11. The device of claim 5, wherein the electronic conductor is an essentially transparent layer of indium/tin oxide on a pane of material selected from the group consisting of glass and plastic.

12. The device of claim 6, wherein the electronic conductor is an essentially transparent layer of indium/tin oxide is a pane of material selected from the group consisting of glass and plastic.

13. The device of claim 7, wherein the electronic conductor is an essentially transparent layer of indium/tin oxide is a pane of material selected from the group consisting of glass and plastic.

14. The device of claim 4, wherein the electronic conductor is an essentially transparent layer of gold.

15. The device of claim 5, wherein the electronic conductor is an essentially transparent layer of gold.

16. The device of claim 6, wherein the electronic conductor is an essentially transparent layer of gold.

17. The device of claim 1, wherein the formula is $-O-(CFR'_f)_b-(CFR_f)_a-SO_3^--Li^+$, where $a=0-3$, $b=0-3$, $a+b=$ at least 1, and $R_f$ and $R'_f$ are independently selected from the group consisting of a halogen and a substantially fluorinated alkyl group having one or more carbon atoms.

18. The device of claim 17, wherein the electronic conductor comprises a layer of a member of the group consisting of gold and indium/tin oxide, wherein the electrochromic material comprises a layer of tungsten oxide, and wherein the counter electrode comprises a layer of gold.

19. The device of claim 18, wherein the ion conducting layer consists essentially of a copolymer of $FFC=CFF$ and $FRC=CFF$, where R is $-O-CFF-CFF-SOOO^--Li^+$.

20. The device of claim 19, wherein the equivalent weight of the copolymer is between about 700 and about 1000.

21. The device of claim 20, wherein the electronic conductor is an essentially transparent layer of indium/tin oxide on a pane of material selected from the group consisting of glass and plastic.

22. The device of claim 21, wherein the electronic conductor is an essentially transparent layer of gold.

* * * * *